May 20, 1924.

C. A. LAMBERT 1,495,086

SUGAR CANE STRIPPER

Filed May 18, 1923

C. A. Lambert
INVENTOR

BY Victor J. Evans
ATTORNEY

WITNESS:

Patented May 20, 1924.

1,495,086

UNITED STATES PATENT OFFICE.

CLEVELAND A. LAMBERT, OF RED LEVEL, ALABAMA.

SUGAR-CANE STRIPPER.

Application filed May 18, 1923. Serial No. 639,924.

*To all whom it may concern:*

Be it known that I, CLEVELAND A. LAMBERT, a citizen of the United States, residing at Red Level, in the county of Covington and State of Alabama, have invented new and useful Improvements in Sugar-Cane Strippers, of which the following is a specification.

This invention relates to a device for stripping the leaves from cane and the like, the general object of the invention being to provide means for causing the stripper to follow the stalk without bruising or scarring it even though the stalk is crooked.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
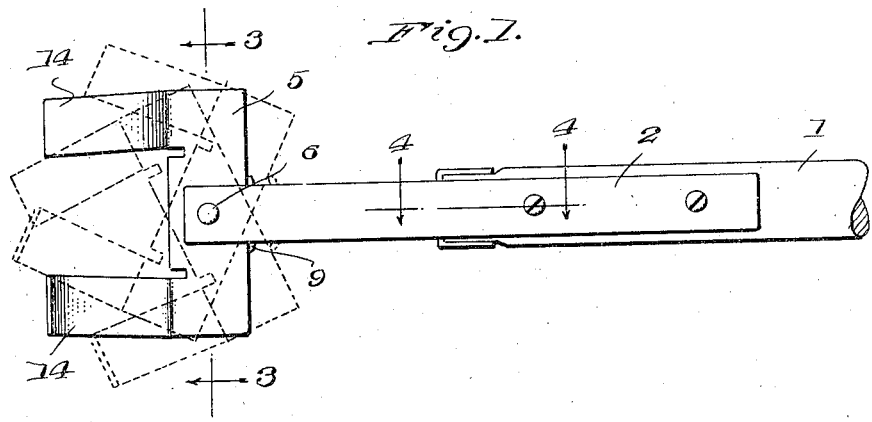
Figure 1 is a side view of the invention.
Figure 2:
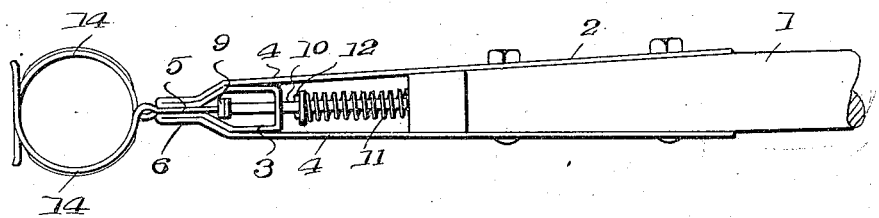
Figure 2 is an edge view.
Figure 3:
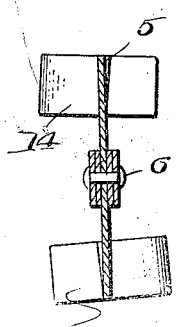
Figure 3 is a section on line 3—3 of Figure 1.
Figure 4:
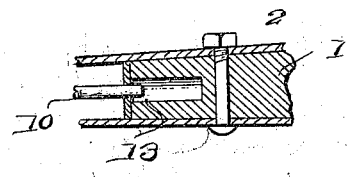
Figure 4 is a section on line 4—4 of Figure 1.

In these views 1 indicates the handle of the stripper, 2 indicates a strap which has its ends bolted to one end of the handle and its central part bent to form a U-shaped member 3 which is located between the two limbs 4 of the strap. The stripper head 5 is pivoted between the limbs by the bolt 6 and the head 9 of a plunger rod 10 operates in the space formed by the U-shaped member and is held in engagement with the inner edge of the head by the spring 11 engaging a pin 12 on the rod. The inner end of the rod engages a socket 13 formed in the end of the handle. This plunger arrangement acts to hold the head at right angles to the handle but permits rocking movement of the head on the handle. The head is provided with the oppositely curved arms 14 which are spaced apart, these arms acting as the knives for stripping the leaves from the stalk.

It will be seen that it is simply necessary to hold the stripper head in horizontal position and press it against the stalk. Then by turning the handle at right angles the arms will engage the stalk and then by pressing the handle downwardly the leaves will be stripped therefrom. The stripper head will automatically follow curves in the stalk and without bruising or scarring the stalk.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A stripper of the class described comprising a handle, a stripper head pivotally connected therewith, a pair of oppositely curved arms carried by the head and spaced apart, means for permitting the head to follow curves in the stalk, such means consisting of a spring pressed plunger for engaging the head for normally holding it in horizontal position.

In testimony whereof I affix my signature.

CLEVELAND A. LAMBERT.